United States Patent
Torres et al.

(10) Patent No.: US 10,653,280 B2
(45) Date of Patent: May 19, 2020

(54) METHOD AND APPARATUS FOR PROCESSING OF FECAL WASTE

(71) Applicants: Miguel Angel Torres, S. Windsor, CT (US); Thomas J. Stapleton, Southwick, MA (US)

(72) Inventors: Miguel Angel Torres, S. Windsor, CT (US); Thomas J. Stapleton, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 47 days.

(21) Appl. No.: 15/872,533

(22) Filed: Jan. 16, 2018

(65) Prior Publication Data

US 2019/0216271 A1 Jul. 18, 2019

(51) Int. Cl.
| | | |
|---|---|---|
| *A47K 11/02* | (2006.01) | |
| *B64G 1/60* | (2006.01) | |
| *B65F 1/14* | (2006.01) | |
| *F23G 5/027* | (2006.01) | |
| *B30B 1/32* | (2006.01) | |
| *B30B 15/34* | (2006.01) | |
| *B30B 9/04* | (2006.01) | |

(52) U.S. Cl.
CPC .............. *A47K 11/023* (2013.01); *B30B 1/32* (2013.01); *B30B 9/04* (2013.01); *B30B 15/34* (2013.01); *B64G 1/60* (2013.01); *B65F 1/1405* (2013.01); *F23G 5/0276* (2013.01); *F23G 2202/30* (2013.01); *F23G 2203/60* (2013.01); *F23G 2900/7003* (2013.01)

(58) Field of Classification Search
CPC ........ A47K 11/023; B64G 1/60; B64D 11/02; C02F 1/06; C02F 2103/005; Y02A 50/454; B01D 1/00; B01D 1/18; B01D 1/24; F26B 5/04; F26B 2200/02; F23G 5/0276
See application file for complete search history.

(56) References Cited

U.S. PATENT DOCUMENTS

| | | | | |
|---|---|---|---|---|
| 3,773,574 A | * | 11/1973 | Bridgforth, Jr. | ......... B64G 1/60 149/18 |
| 5,265,544 A | * | 11/1993 | Bigelow | .............. A47K 11/023 110/345 |
| 5,471,937 A | * | 12/1995 | Kosky | ..................... F23G 5/006 110/211 |
| 9,789,981 B1 | * | 10/2017 | Autrey | ..................... B64G 1/60 |
| 2015/0060258 A1 | | 3/2015 | Appel et al. | |
| 2015/0218469 A1 | * | 8/2015 | Sastri | ........................ C02F 1/06 252/373 |
| 2015/0361372 A1 | * | 12/2015 | Shekarriz | ................ C10L 5/445 71/8 |

* cited by examiner

*Primary Examiner* — Janie M Loeppke
(74) *Attorney, Agent, or Firm* — Carlson, Gaskey & Olds, P.C.

(57) ABSTRACT

A method of treating fecal waste according to an example of the present disclosure includes bringing a reactor containing fecal matter to a first temperature and a first pressure, exposing the reactor to an environment with a second temperature and a second pressure such that the water in the fecal waste undergoes flash evaporation, and pyrolizing the fecal waste. A fecal waste processing unit is also disclosed.

20 Claims, 5 Drawing Sheets

METHOD AND APPARATUS FOR PROCESSING OF FECAL WASTE

STATEMENT REGARDING FEDERALLY SPONSORED RESEARCH OR DEVELOPMENT

This invention was made with government support under contract number NNX16CA06C awarded by the National Aeronautics and Space Administration. The government has certain rights in the invention.

BACKGROUND

During space missions, and in particular long-duration space missions, human fecal waste must be collected, stabilized, and stored for crew safety and comfort as well as planetary protection. Sometimes, useful materials are recovered from the waste. Typically, one aspect of processing fecal waste is the removal of moisture from the waste. This step is time consuming and energy consuming.

SUMMARY

A method of treating fecal waste according to an example of the present disclosure includes bringing a reactor containing fecal matter to a first temperature and a first pressure, and exposing the reactor to an environment with a second temperature and a second pressure, such that the water in the fecal waste undergoes flash evaporation. The method also includes pyrolizing the fecal waste.

In a further embodiment according to any of the foregoing embodiments, the second temperature is less than the first temperature and the second pressure is less than the first pressure.

In a further embodiment according to any of the foregoing embodiments, the environment is approximately at vacuum.

In a further embodiment according to any of the foregoing embodiments, the environment is overboard a spacecraft.

In a further embodiment according to any of the foregoing embodiments, the method of treating fecal waste includes removing the fecal waste from the reactor subsequent the pyrolizing.

In a further embodiment according to any of the foregoing embodiments, the pyrolizing is performed at a temperature of between about 392 to 608 degrees F. (200 to 320 degrees C.) and at a pressure of about 30 psia (0.2 MPa).

In a further embodiment according to any of the foregoing embodiments, the pyrolizing eliminates the biological activity of the fecal waste for safety purposes.

In a further embodiment according to any of the foregoing embodiments, the pyrolizing is torrefecation.

In a further embodiment according to any of the foregoing embodiments, the exposing step is repeated prior to the pyrolizing step until the fecal material reaches a predetermined level of moisture.

In a further embodiment according to any of the foregoing embodiments, the method of treating fecal waste includes determining if the reactor is full prior to the step of bringing the reactor to the first temperature and the first pressure.

In a further embodiment according to any of the foregoing embodiments, the method of treating fecal waste includes compacting the fecal waste prior to the step of bringing the reactor to the first temperature and the first pressure.

In a further embodiment according to any of the foregoing embodiments, the method of treating fecal waste includes providing fecal waste to the reactor in bags.

In a further embodiment according to any of the foregoing embodiments, at least one of the flash evaporation and the pyrolyzing creates products, and further includes expelling the products from the reactor.

In a further embodiment according to any of the foregoing embodiments, the method of treating fecal waste includes condensing the products prior to the expelling.

In a further embodiment according to any of the foregoing embodiments, the pyrolizing produces stabilized fecal matter and utilizes the stabilized fecal matter as one of a radiation barrier or a fertilizer.

A fecal waste processing unit according to an example of the present disclosure includes a reactor configured to receive fecal waste, an outlet configured to expel products from the reactor, and a pressure valve on the reactor. The pressure valve is configured to expose the reactor to an environment, such that water in the fecal waste undergoes flash evaporation.

In a further embodiment according to any of the foregoing embodiments, a piston is configured to compact the fecal waste in the reactor.

In a further embodiment according to any of the foregoing embodiments, the fecal waste processing unit is on a spacecraft.

In a further embodiment according to any of the foregoing embodiments, the environment is overboard the spacecraft.

In a further embodiment according to any of the foregoing embodiments, a fecal waste processing unit includes a heat exchanger configured to condense the products.

DETAILED DESCRIPTION

Figure 1:
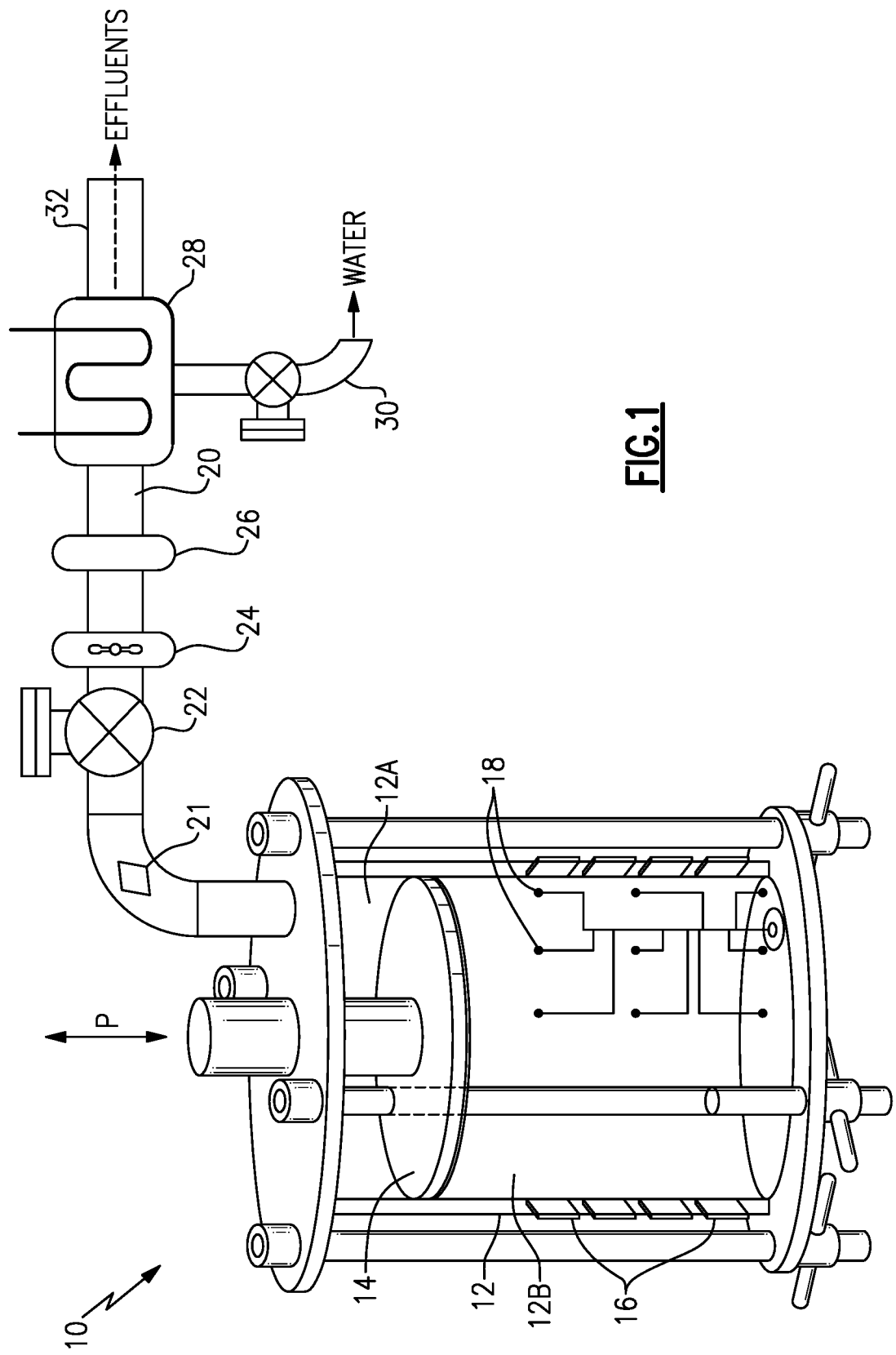
FIG. 1 schematically illustrates a reactor for processing fecal waste.
Figure 2:
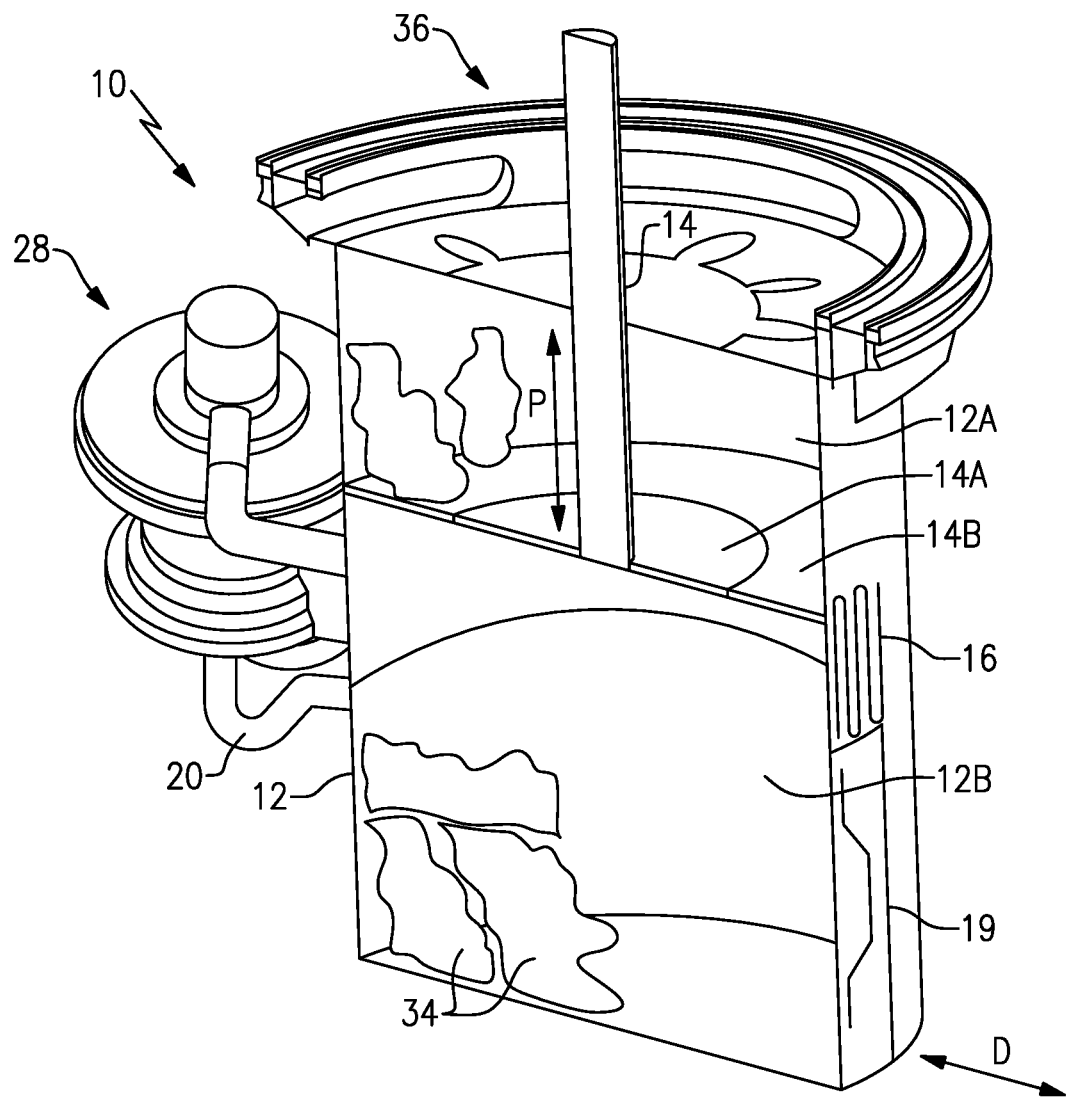
FIG. 2 shows another schematic view of the reactor of FIG. 1.

FIGS. 1-2 schematically illustrates a processing unit 10 for processing fecal waste aboard a spacecraft. The apparatus 10 includes a reactor 12 with a piston 14. In one example, the reactor 12 is configured to fit into an astronaut's commode and collect fecal waste. Once full (as discussed in more detail below), the reactor 12 is placed in the processing unit 10 and processed according to the method described below.

The piston 14 is configured to move in a direction P. As shown in FIG. 2, the piston 14 includes a compaction plate 14A and a chamber separator 14B arranged concentric with the compaction plate 14A. The piston 14 divides the reactor 12 into an antechamber 12A and a compaction chamber 12B. Heaters 16 are arranged on a wall of the reactor 12 in the compaction chamber 12B. Temperature sensors 18 are also arranged in the compaction chamber 12B and are configured to monitor a temperature of the reactor 12.

The reactor 12 also includes a drawer 19, which is configured to open and close in a direction D, for removing fecal waste from the reactor 12.

A conduit 20 expels products from the reactor 12. The conduit 20 includes various sensors and valves. For example, the conduit 20 includes a humidity sensor 21, a pressure release valve 22, a flow meter 24, and a gas spectrometer pickup 26 arranged along the conduit 20. A heat exchanger 28 arranged along the conduit 20 condenses the products, such as steam produced by the method 300, discussed in more detail below. This produces water, which leaves the reactor 12 via a water outlet 30, and other gaseous effluents leave the reactor 12 via outlet 32.

In operation, the reactor 12, and more particularly the compaction chamber 12B, receives bags 34 of fecal waste via an opening 36 into the antechamber 12A. In one example, the bags 34 are made of a hydrophobic material, and are processed according to the method 300 discussed below. The hydrophobic bags allow the bags 34 to be compacted in the compaction chamber 12B such that gas is released from the bags 34 without releasing moisture.

The size, form, and operation of the apparatus 10 according to the method 300 discussed below are selected to accomplish processing of fecal waste such that time and energy input required to process the fecal waste are minimized. Accordingly, the size, form, and operation of the apparatus 10 varies with respect to several design parameters, including the amount of water in the fecal waste, the fecal waste form factor, the available power, the pressure and temperature history of the apparatus, the fecal waste compaction and agitation history of the apparatus 10, the placement and number of heaters 16 in the reactor 12, and/or the amount of air in recirculation (by volumetric flow rate) through the fecal waste in the reactor 12. Other design considerations include compatibility with existing waste processing systems in spacecraft, reactor 12 material, odor control, water recovery, carbon dioxide recover, cleanliness, product removal, crew labor, and failure modes.

Figure 3:
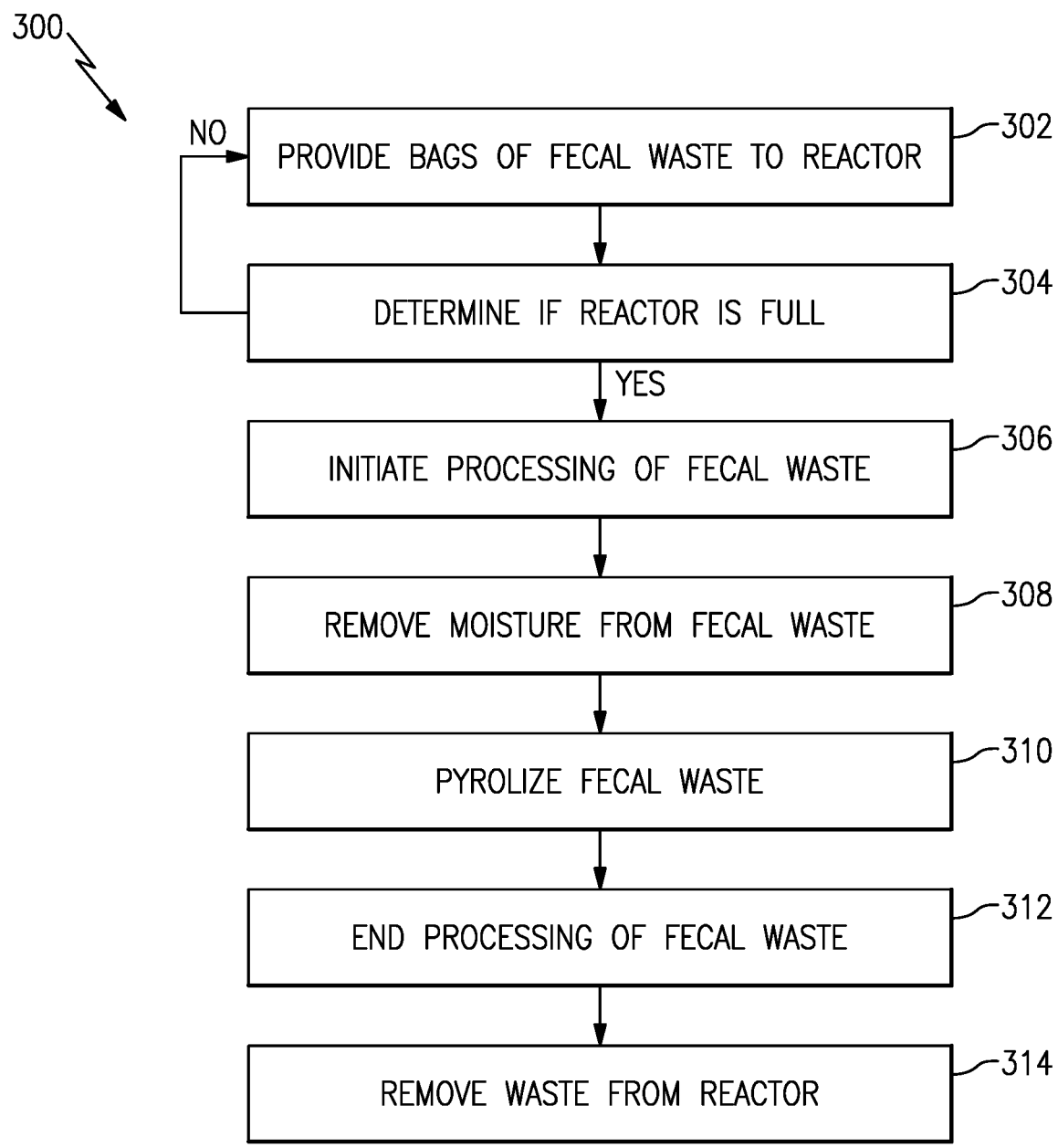
FIG. 3 shows a method of processing fecal waste.

Referring to FIG. 3, a method of processing fecal waste in the reactor 12 is shown. In step 302, bags 34 of fecal waste are provided to the reactor via opening 36. The bags 34 pass into the compression compaction chamber 12B via an opening in the chamber separator 14B, in one example. In another example, bags 34 are provided directly to the compaction chamber 12B.

Step 304 involves determining whether the reactor 12 is full. The reactor 12 is full when in contains a predetermined amount of fecal waste, for example, 1 gallon. This step can be accomplished by any known sensor mechanism. If the reactor 12 is not full, the method returns to step 302 as shown in FIG. 3. If the reactor 12 is full, the method proceeds to step 306.

Step 306 involves initiating processing of fecal waste. The initiating is accomplished by, for instance, pressing a button on the unit 10. In one example, initiating processing of fecal waste includes performing a system check on the unit 10. In another example, initiating processing of fecal waste includes heating the reactor with heaters 16 according to readings from temperature sensors 18 and/or pressurizing the reactor 12 by moving piston 14 and/or by a pump (not shown), in addition to or instead of performing a system check on the unit 10. The initial temperature and pressure are selected as discussed below. In yet another example, initiating processing of fecal waste includes compacting the fecal waste with piston 14. The compacting improves heat distribution from heaters 16 to the fecal waste and through the fecal waste.

Step 308 involves removing moisture from the fecal waste. This step is the most time- and energy-consuming step of method 300. Efficiency of moisture removal in terms of both time and energy use is increased by maximizing heat transfer from the reactor 12 walls, where heaters 16 are placed and into the bulk of the fecal waste. This efficiency in turn is effected by heater 16 placement and power provided to the heaters 16.

Figure 4:
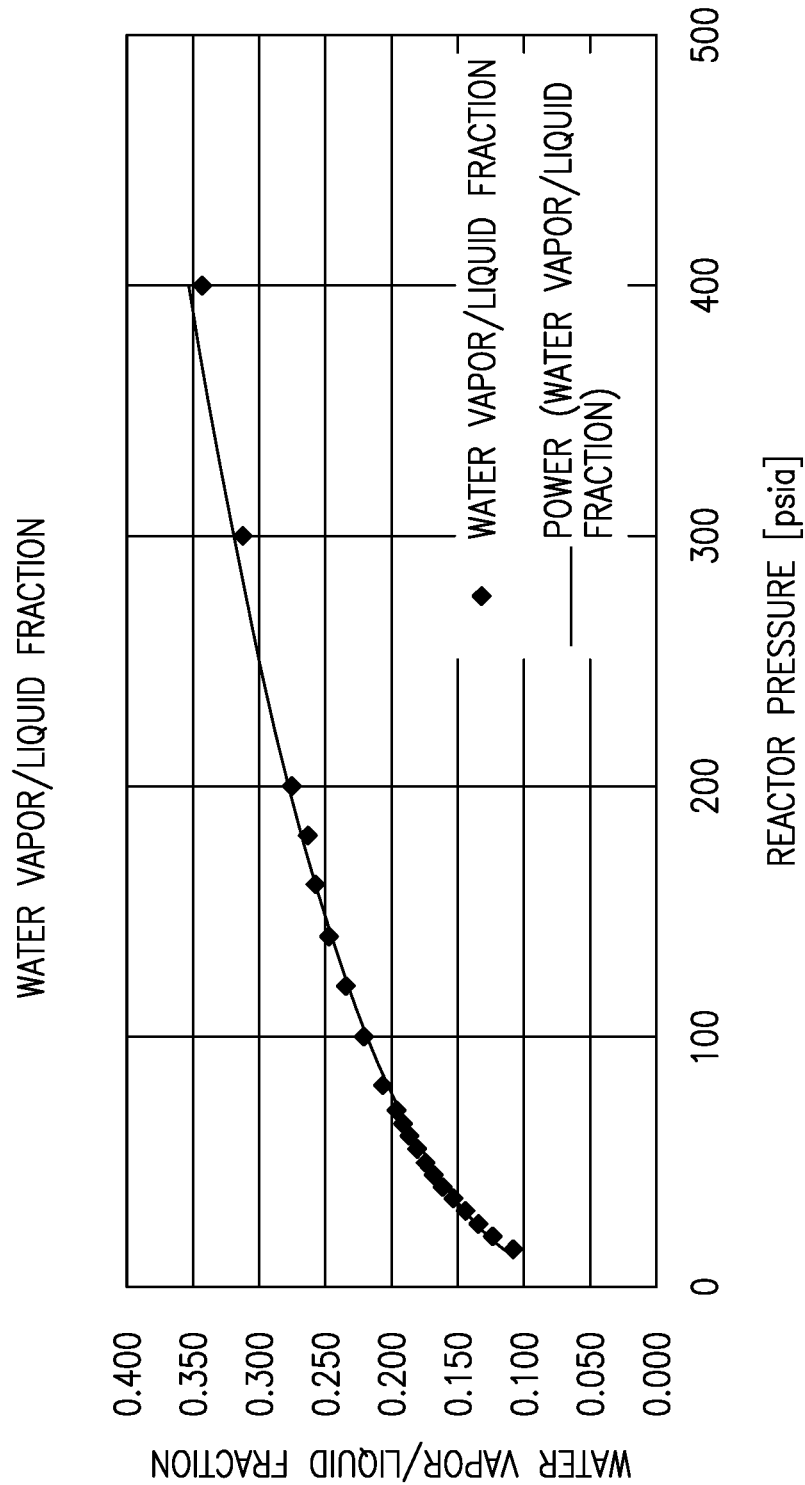
FIG. 4 shows a plot of X from Table 1 (representing mass fraction of vapor to liquid water) for various reactor pressures.

Moisture is removed from the fecal waste by evaporation (which releases steam). The steam leaves the reactor 12 via conduit 20 and water outlet 32 (FIGS. 1-2). Other effluents released during the moisture removal step 308, such as carbon dioxide and/or carbon monoxide, leave the reactor 12 via conduit 20 and outlet 32. FIG. 4 shows a plot of X from Table 1 above for various reactor 12 pressures.

Evaporation requires the temperature of water in the fecal waste to reach the saturation (boiling) point of water. The saturation point of water depends on its pressure. At atmospheric pressure (14.8 psig or 0.1 MPa), the saturation point of water is 212 degrees F. (100 degrees C.). At higher pressures, the saturation point of water is lower than 212 degrees F. (100 degrees C.). For instance, at 145 psig or 1 MPa, the saturation point of water is 184 degrees C. (363 degrees F.).

The moisture removal step 308 is accomplished by "flash evaporation" (also known as "adiabatic flashing"). Flash evaporation is achieved by exposing the reactor to low temperature and pressure overboard the spacecraft by opening the release valve 22. Flash evaporation is an isenthalpic process (one that proceeds without any change in enthalpy) accomplished by releasing a hot liquid condensate at a first temperature and first pressure to an environment with substantially lower temperature and pressure. For instance, releasing a liquid condensate at 145 psig or 1 MPa to an environment which is substantially colder and has substantially lower pressure, such as overboard of a spacecraft. The liquid condensate contains too much energy to remain liquid at the substantially lower pressure and temperature. However, the process is isenthalpic (that is, enthalpy is not added or removed from the system). As a result, part of the water molecules absorb excess energy as latent heat and evaporate to form steam. The temperature of the remaining water molecules drop down to the liquid's saturation temperature at the substantially lower pressure. Effectively, when hot liquid condensate is discharged to a substantially lower temperature and pressure environment, its total energy (enthalpy) stays the same, but its saturation point drops. Therefore, the amount of energy needed to evaporate the water drops. Flash evaporation thus takes advantage of the cold and approximately vacuum conditions in space (i.e., overboard a spacecraft) to reduce the amount of energy needed to cause evaporation of water.

The amount of water that is vaporized in flash evaporation (X) is determined by the following equation:

$$X = \frac{H_r^L - H_d^L}{H_r^V - H_d^L}$$

Where X is the weight ratio of vaporized water to remaining liquid;
$H_R^L$ is the reactor liquid enthalpy at upstream temperature and pressure;
$H_d^V$ is the flashed vapor enthalpy at the downstream pressure and corresponding saturation temperature; and
and $H_d^L$ is the residual liquid enthalpy at downstream pressure and corresponding saturation temperature.

Table 1 below shows X (the weight ratio of vaporized water to remaining liquid) at the condition where $H_d^V$ is at vacuum conditions for various reactor 12 (upstream) pressures, according to the above equation:

TABLE 1

| Reactor Pressure [psia] | H sat. Liquid [BTU/lbm] | H sat. Liquid [BTU/lbm] | X |
|---|---|---|---|
| 15 | 181.21 | 1150.66 | 0.108 |
| 20 | 196.27 | 1156.19 | 0.123 |
| 25 | 208.52 | 1160.54 | 0.135 |
| 30 | 218.93 | 1164.13 | 0.145 |
| 35 | 228.03 | 1167.18 | 0.153 |
| 40 | 236.15 | 1169.82 | 0.161 |
| 45 | 243.48 | 1172.15 | 0.168 |
| 50 | 250.21 | 1174.23 | 0.175 |
| 55 | 256.42 | 1176.11 | 0.181 |
| 60 | 262.21 | 1177.81 | 0.186 |
| 65 | 267.63 | 1179.37 | 0.192 |
| 70 | 272.44 | 1180.72 | 0.196 |
| 80 | 282.13 | 1183.35 | 0.206 |
| 100 | 298.52 | 1187.50 | 0.221 |
| 120 | 312.55 | 1190.74 | 0.235 |
| 140 | 324.92 | 1193.36 | 0.247 |
| 160 | 336.02 | 1195.51 | 0.258 |
| 180 | 342.14 | 1197.29 | 0.264 |
| 200 | 355.46 | 1198.78 | 0.276 |
| 300 | 393.96 | 1203.34 | 0.314 |
| 400 | 424.62 | 1204.99 | 0.343 |

The initial temperature and pressure of the reactor 12 (at which the reactor is set in step 306) are selected as follows. As an example, as shown in FIG. 4, if the reactor 12 is at a pressure of 50 psia (0.3 MPa), the water contained in the fecal waste has a saturation point of 250 degrees F. (121 degrees C.). The reactor 12 is thus heated by heaters 16 such that the water in the fecal waste reaches a temperature of 250 degrees F. (121 degrees C.) and then the release valve 22 (FIG. 1) is opened to expose the fecal waste to conditions approximately at vacuum, such as overboard the space craft. At this point, the water in the fecal waste contains too much energy (enthalpy of 1176.11 BTU/lb, as shown in Table 1 above) to remain in liquid form once it is exposed to vacuum. According to Equation 1 above, X is 17.5%. In other words, 17.5% of the total amount of water in the fecal waste is evaporated by flash evaporation at 50 psia (0.3 MPa) and 250 degrees F. (121 degrees C.). The resulting steam leaves the reactor 12 via conduit 20, where it is condensed by heater 28 and exits via water outlet 32 (FIGS. 1-2).

Figure 5:
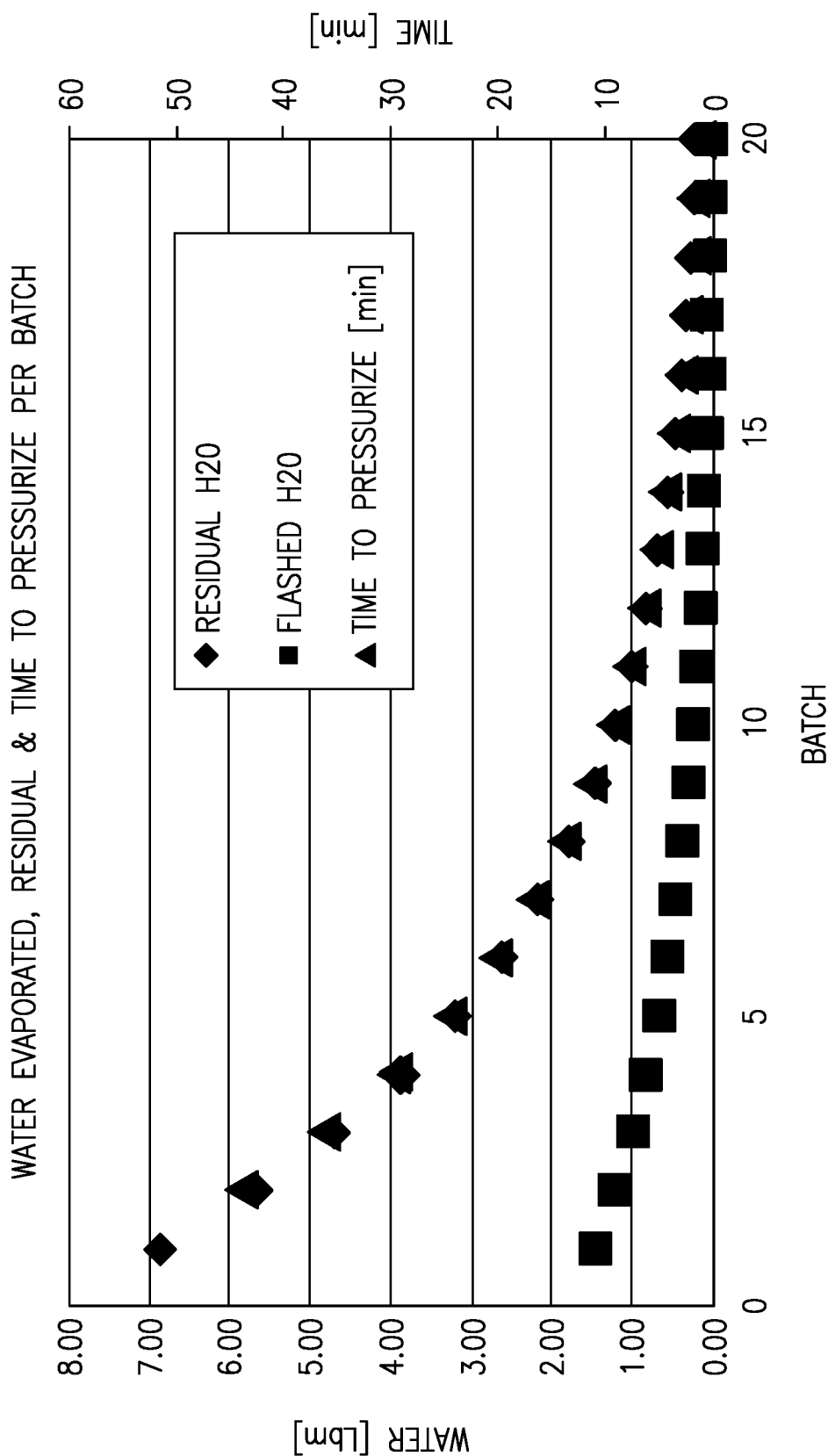
FIG. 5 shows a plot of amount of water remaining, amount of water removed, and time to pressurize the reactor of FIGS. 1-2 for 20 batches with an initial water content in the reactor of 8.35 lb.

Step 308 is repeated until the amount of water in the remaining fecal matter is less than a predetermined maximum amount of water. The predetermined maximum amount of water depends on, for example, the initial amount of fecal waste, its water content, and the initial temperature and pressure of the reactor 12. At each repetition an amount of remaining water in the fecal waste is evaporated according to Equation 1. As water is removed, the time for the flash evaporation to occur decreases for each repetition, as shown in FIG. 5. More particularly, FIG. 5 plots an amount of remaining water ("Residual H2O") and removed water from the flash evaporation ("Flashed H2O") for 20 batches. Furthermore, the time and energy required to heat the reactor 12 for subsequent repetitions is decreased since the reactor is not completely cooled between repetitions. FIG. 5 also shows the time required to pressurize the reactor 12 for 20 batches.

In the example above, where the reactor is initially at 50 psia (0.3 MPa) and 250 degrees F. (121 degrees C.), at each repetition 17.5% of the water is evaporated. For 1 gallon of fecal matter at 90% water content (8.35 lb water), after 20 repetitions of step 308, 2.1% of the original amount of water in the fecal remains. In other examples, the number of repetitions necessary varies with the original amount of water in the fecal waste and the starting temperature and pressure of the reactor 12. Accordingly, the initial temperature and pressure of the reactor 12 are selected to minimize processing time (which is in turn based on number of repetitions necessary and the time to bring the reactor to the initial temperature and pressure according to the amount of energy input available) and overall process energy.

In step 310, the fecal waste in the reactor 12 is pyrolized. More particularly, the fecal waste undergoes torrefecation (a mild pyrolysis). Torrefecation eliminates the biological activity of the fecal waste for safety purposes. Torrefecation involves bringing the fecal matter to a temperature of between about 392 to 608 degrees F. (200 to 320 degrees C.) at relatively low pressure (for instance, about 30 psia or 0.2 MPa) and in the absence of oxygen. This causes any remaining water in the fecal waste as well as superfluous volatiles to be released from the fecal waste and exit the reactor 12 via outlet 20 (FIGS. 1-2). Since the majority of the water in the fecal waste has already been removed in step 208, torrefecation proceeds more quickly and with less energy input (due to the decrease in mass of the fecal waste with water removal) than if the water had not been removed in step 208.

Step 312 involves ending the processing of fecal waste. In one example, ending the processing of fecal waste includes cooling down the reactor 12 by turning off heaters 16.

In step 314, processed (stabilized) fecal waste is removed from the reactor 12 via the drawer 19. The stabilized fecal waste can then be repurposed, for example, it could be used as a radiation barrier or a fertilizer.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

The invention claimed is:

1. A method of treating fecal waste comprising:
    bringing a reactor containing fecal matter to a first temperature and a first pressure;
    exposing the reactor to an environment with a second temperature and a second pressure, such that water in the fecal waste undergoes flash evaporation; and
    pyrolizing the fecal waste in the reactor after the exposing.

2. The method of claim 1, wherein the second temperature is less than the first temperature and the second pressure is less than the first pressure.

3. The method of claim 2, wherein the environment is approximately at vacuum.

4. The method of claim 3, wherein the environment is overboard a spacecraft.

5. The method of claim 1, further comprising removing the fecal waste from the reactor subsequent the pyrolizing.

6. The method of claim 1, wherein the pyrolizing is performed at a temperature of between about 392 to 608 degrees F. (200 to 320 degrees C.) and at a pressure of about 30 psia (0.2 MPa).

7. The method of claim 1, wherein the pyrolizing eliminates the biological activity of the fecal waste for safety purposes.

8. The method of claim 1, wherein the pyrolizing is torrefecation.

9. The method of claim 1, wherein the exposing step is repeated prior to the pyrolizing step until the fecal material reaches a predetermined level of moisture.

10. The method of claim 1, further comprising determining if the reactor is full prior to the step of bringing the reactor to the first temperature and the first pressure.

11. The method of claim 1, further comprising compacting the fecal waste prior to the step of bringing the reactor to the first temperature and the first pressure.

12. The method of claim 1, further comprising providing fecal waste to the reactor in bags.

13. The method of claim 1, wherein at least one of the flash evaporation and the pyrolyzing creates products, and further comprising expelling the products from the reactor.

14. The method of claim 13, further comprising condensing the products prior to the expelling.

15. The method of claim 1, wherein the pyrolizing produces stabilized fecal matter, and further comprising utilizing the stabilized fecal matter as one of a radiation barrier or a fertilizer.

16. A fecal waste processing unit, comprising:
a reactor configured to receive fecal waste for pyrolysis of the fecal waste;
an outlet configured to expel products from the reactor, wherein at least some of the products are products from pyrolysis of the fecal waste; and
a pressure valve on the reactor, the pressure valve configured to expose the reactor to an environment, such that water in the fecal waste undergoes flash evaporation.

17. The fecal waste processing unit of claim 16, further comprising a piston configured to compact the fecal waste in the reactor.

18. The fecal waste processing unit of claim 16, wherein the fecal waste processing unit is on a spacecraft.

19. The fecal waste processing unit of claim 18, wherein the environment is overboard the spacecraft.

20. The fecal waste processing unit of claim 16, further comprising a heat exchanger configured to condense the products.

* * * * *